Figure 1:
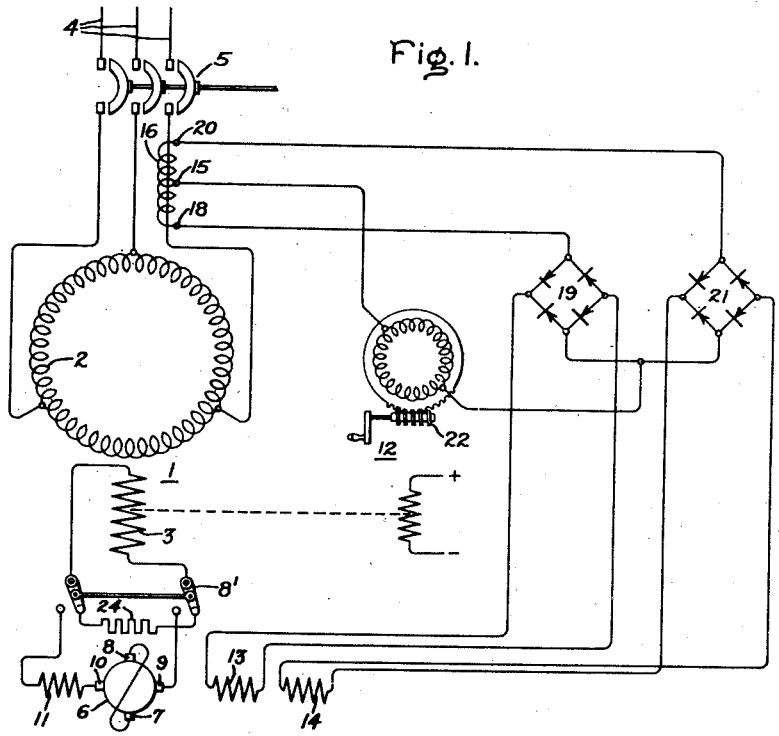

Sept. 17, 1940.  E. F. W. ALEXANDERSON  2,215,312

EXCITATION CONTROL SYSTEM FOR SYNCHRONOUS MACHINES

Filed March 18, 1939

Inventor:
Ernst F. W. Alexanderson,
by Harry E. Dunham
His Attorney.

Patented Sept. 17, 1940

2,215,312

UNITED STATES PATENT OFFICE 2,215,312

EXCITATION CONTROL SYSTEM FOR SYNCHRONOUS MACHINES

Ernst F. W. Alexanderson, Schenectady, N. Y., assignor to General Electric Company, a corporation of New York Application March 18, 1939, Serial No. 262,671

11 Claims. (Cl. 172—120)

My invention relates to excitation control systems for synchronous machines and the object of my invention is to provide an improved excitation control system which will increase the stability of the synchronous operation of the machine and which will cause the machine, while driving its load at subsynchronous speeds, to resynchronize as soon as possible without producing excessive current disturbance in the alternating current supply circuit connected to the armature winding of the machine.

A synchronous machine, the field winding of which is supplied from an excitation source having a definite polarity, must slip at least a whole cycle when it is pulled out of step before it can resynchronize. In accordance with my present invention, I employ an excitation source of a type which will reverse its polarity quickly during each slip cycle when the machine is operating out of step so that the machine may resynchronize equally well during either half cycle of slip. I accomplish this result by using, as an exciter for the synchronous machine, an armature reaction excited dynamo-electric machine which functions as a dynamo-electric amplifier, and by controlling the output of the amplifier in response to changes in the speed of the synchronous machine.

An armature reaction excited dynamo-electric machine is a dynamo-electric machine having a rotor which is provided with a winding connected to a commutator in a manner similar to an ordinary direct current machine. Ordinarily four brushes engage the commutator, two of which are 180 electrical degrees apart and constitute the output brushes of the machine and the other two of which are arranged in quadrature electrical relation with respect to the output brushes and are connected together through a low impedance circuit so that they are, in effect, short circuited. The stator, within which the rotor rotates, may be provided with windings arranged in several different ways so as to vary the electrical characteristics of the machine. When the stator winding is so arranged that the current therein produces a flux in the rotor in line with the output brushes so that it is displaced 90 electrical degrees from the axis of the short-circuited brushes and the rotor is rotated, this flux induces a voltage in the rotor conductors so that a large current flows through the short-circuited brushes. This large current through the rotor conductors in turn sets up a secondary flux many times greater than the flux produced by the current in the stator winding and displaced therefrom by 90 electrical degrees, and this secondary flux induces a voltage in the rotor conductors so that the voltage appearing across the output brushes of the machine is many times greater than the voltage across the short-circuited brushes. This machine, therefore, is of the type that has two stages of amplification with a single rotor winding; the first stage of amplification being from the control winding on the stator to the short-circuited brushes, and the second stage is from the short-circuited brushes to the output brushes. With this type of machine, an amplification as great as 1000 to 1 may be obtained so that for every watt change in the input to the control winding on the stator, a kilowatt change in the output may be obtained from the output brushes. The speed of response of this type of machine is also much higher than the ordinary direct current generator or exciter. This high speed of response can be explained by the two stage amplification. In order to obtain an overall amplification of 1000 to 1, it is only necessary to have an amplification of slightly more than 30 to 1 in each of the two stages. The time constant for each stage can, therefore, be kept low so that an overall amplification of 1000 to 1 can be obtained with a time constant characteristic corresponding to that of a single amplifier having an amplification ratio of only approximately 30 to 1.

Since a dynamo-electric amplifier of the armature reaction excited type has these characteristics of high emplification and rate of response to changes in the excitation of its control winding, I find that, when it is used as a source of excitation for a synchronous machine and the energization of the control winding thereof is varied in response to speed changes of the synchronous machine, the stability and synchronizing operations of the synchronous machine are superior to those obtained when an ordinary direct current exciter is used as a source of excitation for the field winding of the machine.

Figure 2:
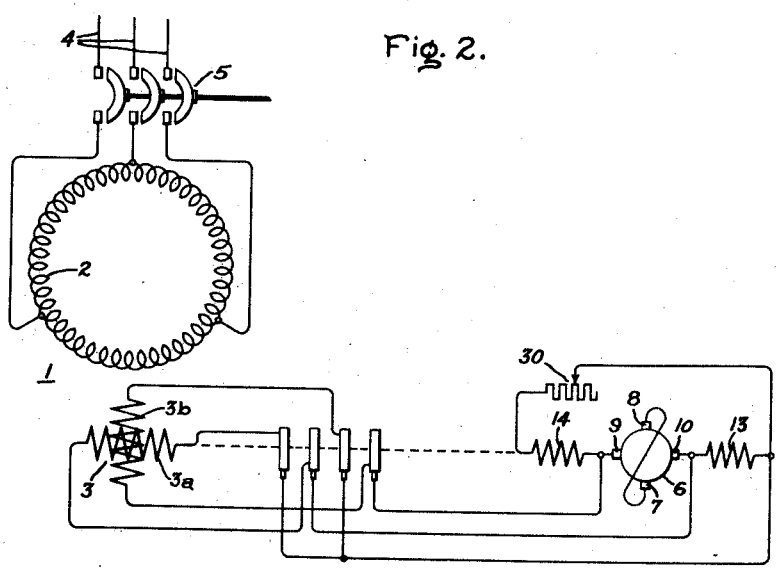

My invention will be better understood from the following description when taken in connection with the accompanying drawing, Figs. 1 and 2 of which diagrammatically illustrate respectively a synchronous motor excitation control system embodying my invention, and its scope will be pointed out in the appended claims.

Referring to Fig. 1 of the drawing, I represents a synchronous motor having a polyphase armature winding 2 and a field winding 3. The armature winding 2 is arranged to be connected to a suitable polyphase supply circuit 4 by the switching means 5.

As an exciter for supplying excitation current to the field winding 3 of the motor 1 so as to cause it to operate as a synchronous motor in a manner well-known in the art, I provide an armature reaction excited dynamo-electric machine 6 which may be driven by any suitable driving means. As shown, the exciter 6 has short-circuited brushes 7 and 8 and output brushes 9 and 10 which are arranged to be connected to the field winding 3 of the synchronous motor 1 by a field switch 8'. Included in the circuit of the motor field winding 3 is a series compensating winding 11 for the exciter 6. For producing in the exciter 6 a unidirectional flux while the motor 1 is operating in synchronism and an alternating flux of slip frequency, while the motor 1 is operating out of synchronism, I provide a pilot alternator 12 which is driven in any suitable manner so that the frequency thereof, when the motor 1 is operating in synchronism, is the same as the frequency of the supply circuit 4 and so that the frequency thereof varies with the speed of the motor 1 when it is operating out of synchronism. As shown, the pilot alternator 12 is driven directly by the synchronous motor 1.

The voltage of the pilot alternator 12 is combined with a suitable voltage obtained from the supply circuit 4 in a manner well known in the art as heterodyne detection so that two differentially arranged control windings 13 and 14, which are provided on the exciter 6, are energized to produce a flux having a frequency which is equal to the difference between the frequencies of the supply circuit 4 and the pilot generator 12. The voltage which is obtained from the supply circuit 4 for comparison with the voltage of the pilot alternator 12 may be a voltage proportional to either the supply circuit voltage or to the motor armature current or a combination of the supply circuit voltage and motor armature current. As shown in the drawing, one phase of the motor armature current is used to produce a voltage for comparison with the voltage of the pilot alternator 12. One terminal of the pilot generator 12 is shown connected to the middle terminal 15 of the secondary winding of a current transformer 16, the primary of which is connected in series with one of the phase conductors supplying current to the armature winding 2. The other terminal of the pilot generator 12 is connected to the end terminal 18 of the secondary winding of the transformer 16 in series with a full wave rectifier 19, and the control winding 13 of the generator 6 and is connected to the other end terminal 20 of the secondary winding of the transformer 16 in series with a full wave rectifier 21 and the control winding 14 of the generator 6. Preferably suitable means, examples of which are well known in the art, are provided for readily varying the phase relation of the voltage of the pilot generator 12 relative to the secondary voltage of the transformer 16. As shown, this result is accomplished by providing a stator shifting arrangement 22 for the stator of the generator 12.

With the arrangement shown, the relative energizations of the control windings 13 and 14 depend upon the magnitudes of and the phase relation between the secondary voltage of the transformer 16 and the voltage of the pilot alternator 12. The voltage applied to the control winding 14 is equal to the vector sum of the voltages of the pilot alternator 12 and the secondary voltage between the terminals 15 and 20 of the transformer 16 and the voltage applied to the control winding 13 is equal to the vector difference between the voltage of the pilot generator 12 and the secondary voltage between the terminals 15 and 18 of the transformer 16. Therefore, as long as the motor 1 remains in synchronism, the currents in the differentially wound control windings 13 and 14 set up a resultant unidirectional flux having a value which depends upon the phase relation between and the magnitudes of the pilot alternator voltage and the motor armature current. Since the flux produced by the currents in the control windings 13 and 14 is unidirectional, the exciter 6 supplies direct current to the field winding 3 of the motor 1 while the motor is operating in synchronism. By properly adjusting the magnitude and phase of the pilot generator 12, the resultant flux set up by the field windings 13 and 14 during synchronous operation can be made to vary in response to the changes produced in the motor armature current due to changes in the motor load.

When the motor 1 is operating out of synchronism, each of the control windings 13 and 14 has impressed across it a voltage which varies over a predetermined range once every slip cycle in such a manner that the voltage applied to the control winding 13 is a maximum when the voltage impressed across the control winding 14 is a minimum and vice versa. Consequently, an alternating flux of slip frequency is set up by the currents in the control windings 13 and 14 which causes the exciter 6 to supply an amplified current of slip frequency to the motor field winding 6.

The phase relation between the motor armature flux and the flux of slip frequency set up by the current supply to the motor field winding 3 by the exciter 6 is adjusted by means of the phase shifting device 12 so that the reaction between these two fluxes tends to pull the machine into step.

The operation of the arrangement shown in Fig. 1 is as follows:

When it is desired to start the motor 1, the switch 5 is closed so that the armature winding 2 is connected to the supply circuit 4 and the field switch 8' is in the position shown so that the discharge resistor 24 is connected across the terminals of the field winding 3. The motor 1 then starts as an induction motor and accelerates to a predetermined subsynchronous speed which depends upon the motor load. The field switch 8' is then closed so as to connect the field winding 3 across the output brushes 9 and 10 of the exciter 6 so that a current of slip frequency having the proper phase and magnitude is supplied to the field winding 3 to increase the synchronizing torque. By increasing the current of slip frequency in the field winding 3, the exciter 6 has the effect of a reduction in the resistance of the field circuit which, as is well known, causes the motor to operate at a lower slip. Therefore, by properly controlling the amplification of the exciter 6, the slip of the motor 1 may be gradually reduced to zero so that the motor pulls into step. The violent pulsations, which occur during the transition from induction motor operation to synchronous operation when direct current is supplied to the field circuit in the usual manner to synchronize a motor, are avoided by my improved arrangement.

When the motor 1 is operating as a synchronous motor, direct current flows through the windings 13 and 14 so that the exciter 6 supplies direct current to the motor field winding. The value of this exciting current varies with the motor load as the power angle of the motor 1 and the magnitude and angle of the motor armature current change with variations in load and thus produce a corresponding change in the excitation of the exciter field windings 13 and 14.

When the motor 1 pulls out of step, the exciter 6 again supplies current of slip frequency to the field winding 3 which causes the motor to resynchronize as soon as the load on the motor has been reduced sufficiently to permit it to do so. While operating out of step, motor 1 operates at a lower slip than it would as an ordinary induction motor carrying the same load because of the increased current of slip frequency in the motor field circuit supplied by the exciter 6. Therefore, the motor 1 with the exciter 6 supplying slip frequency current to the field winding 3 can pull into step a greater load than it could carry as an induction motor without the exciter. It would be impossible to do this with a conventional exciter connected to the field winding 3.

In the embodiment of my invention shown in Fig. 2, I have shown a synchronous motor 1 which has a quarter phase distributed winding 3 on its rotor. One of the rotor phase windings 3a is connected across a control winding 13 of the exciter 6 of the armature reaction excited type, and the other rotor phase winding 3b is connected across the main output brushes 9 and 10 of the exciter 6. Therefore, when the motor is operating out of step, the current of slip frequency, which is induced in the rotor winding 3a, flows through the control winding 13 of the exciter 6 and causes the exciter to supply an amplified current of slip frequency to the motor rotor windng 3b. Consequently, the motor 1 operates at a lower slip. As shown in the drawing, the control winding 13 is also connected in series with the output brushes 9 and 10 of the exciter 6 so that this winding functions both as a control winding and a compensating winding for the exciter. In some cases it may be desirable not to have the control winding 13 connected in series with the output brushes of the exciter but to provide a separate compensating winding.

When the motor 1 is operating in sychronism at a steady load, there is no current induced in the winding 3a. Therefore, it is necessary to use some other means for causing the exciter 6 to supply normal direct current excitation to the motor winding 3b. This is accomplished in the arrangement shown in the drawing by providing the exciter 6 with a second control winding 14 which is connected in series with an adjustable resistor 30 across the output brushes 9 and 10 of the exciter so that the exciter is self-excited. This self-exciting winding 14 may be either in the axis of the main output brushes, as shown, or in the axis of the short-circuited brushes 7 and 8.

The operation of the embodiment shown in Fig. 2 will be evident from the above-description.

When the motor 1 is operating in synchronism and carrying a steady load, the exciter 6 is self-excited by the control winding 14 and supplies normal excitation to the field winding 3b of the motor 1. Under these conditions, no current is induced in the secondary phase winding 3a of the motor 1 and, therefore, no induced current flows through the control winding 13 of the generator 20.

It is well known that whenever the load changes on a synchronous motor, a phase displacement of the rotor relative to the rotating armature flux occurs which causes a current to be induced in the rotor windings and that the direction and magnitude of this induced current depend on the relative direction and magnitude of the movement occurring between the armature flux and the rotor winding. The control winding 13 of the exciter 6 is so connected to the secondary phase winding 3b that the induced current which flows through the winding 13, as a result of an increased load being thrown onto the motor, is in the proper direction to increase the normal voltage of the exciter 6 and, when the load is decreased, the current through the winding 13 is in the proper direction to decrease the excitation of the exciter. Therefore, due to the high amplification and high rate of response of the type of exciter I employ for supplying excitation to the motor 1, the stability is materially increased during synchronous operation of the motor because its field excitation is quickly increased to increase the synchronizing torque of the motor whenever the load on the motor is suddenly increased.

When the load on the motor increases to such a value as to pull the motor out of step, a voltage of slip frequency is induced in the secondary phase winding 3b which causes a current of slip frequency to flow through the control winding 13 so that, during half of each slip cycle, the current through the control winding 13 is in one direction and during the remaining portion of each slip cycle, the current flows through the control winding 13 in the opposite direction. Since the output voltage of the exciter 6 follows the current flowing through the control winding 13, it will be seen that the exciter supplies an amplified current of slip frequency to the motor field winding 3a so that the motor 1 may synchronize during either half cycle of slip. If the overload is of short duration, the motor 1 may resynchronize after slipping only one pole or if the overload is of somewhat longer duration, the motor may slip several poles before resynchronizing. While the motor is thus slipping, it operates as an induction motor and if each of the two phase windings of the secondary winding 3 were only short-circuited, the slip would depend on the resistance of the circuits of the secondary phase windings. However, when a dynamo-electric amplifier of the armature reaction excited type is included in the circuit of one of the secondary phase windings, the effect of this exciter upon the induction motor characteristics of the synchronous machine is the same as a reduction in secondary resistance. Consequently, the exciter 6 operates, while the motor is slipping, to produce, at the proper time during each half cycle, a synchronizing torque which tends to make the motor operate at a lower slip.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An excitation control system for a synchronous machine connected to an electric supply circuit comprising a dynamo-electric exciter of the armature reaction excited type having its output brushes connected to the field winding of the synchronous machine, and means for producing in line with the output brushes of said exciter a unidirectional flux while said machine is operating in synchronism and an alternating flux of slip frequency while said machine is operating out of synchronism.

2. An excitation control system for a synchronous machine connected to an electric supply circuit comprising a dynamo-electric exciter of the armature reaction excited type having its output brushes connected to the field winding of the synchronous machine, two control windings for said exciter, and means for energizing said windings to produce in line with the output brushes of said exciter a unidirectional flux while said machine is operating in synchronism and an alternating flux of slip frequency while said machine is operating out of synchronism.

3. An excitation control system for a synchronous machine connected to an electric supply circuit comprising a dynamo-electric exciter of the armature reaction excited type having its output brushes connected to the field winding of the synchronous machine, a control winding for said exciter, and means for supplying current of slip frequency to said control winding while said machine is operating out of synchronism.

4. An excitation control system for a synchronous machine connected to an electric supply circuit comprising a dynamo-electric exciter of the armature reaction excited type having its output brushes connected to the field winding of the synchronous machine, a control winding for said exciter, means for supplying current of slip frequency to said control winding while said machine is operating out of synchronism, and a second control winding for said exciter connected to the output brushes of said generator.

5. An excitation control system for a synchronous machine connected to an electric supply circuit comprising a dynamo-electric exciter of the armature reaction excited type having its output brushes connected to the field winding of the synchronous machine, a control winding for said exciter, means for supplying current of slip frequency to said control winding while said machine is operating out of synchronism, a second control winding for said exciter, and means for supplying current of slip frequency to said second control winding while said machine is operating out of synchronism and direct current while said machine is operating in synchronism.

6. An excitation control system for a synchronous machine connected to an electric supply circuit comprising a dynamo-electric exciter of the armature reaction excited type having its output brushes connected to the field winding of the synchronous machine, an auxiliary winding on said machine arranged so that a voltage of slip frequency is induced therein when said machine is operating out of synchronism, and a control winding for said exciter connected to said auxiliary winding.

7. An excitation control system for a synchronous machine connected to an electric supply circuit comprising a dynamo-electric exciter of the armature reaction excited type having its output brushes connected to the field winding of the synchronous machine, a pilot alternator, means for driving said pilot alternator at a speed proportional to the speed of said machine, and means dependent upon the difference between the frequencies of said alternator and supply circuit for producing in said exciter an exciting flux of slip frequency when said machine is operating out of synchronism.

8. An excitation control system for a synchronous machine connected to an electric supply circuit comprising a dynamo-electric exciter of the armature reaction excited type having its output brushes connected to the field winding of the synchronous machine, a pilot alternator, means for driving said alternator at a speed proportional to the speed of said machine so that the frequency of said alternator is the same as the frequency of the supply circuit when said machine is operating in synchronism, and means controlled by the voltage of said alternator for producing in said exciter an alternating flux of slip frequency when said machine is operating out of synchronism.

9. An excitation control system for a synchronous machine connected to an electric supply circuit comprising a dynamo-electric exciter of the armature reaction excited type having its output brushes connected to the field winding of the synchronous machine, a pilot alternator, means for driving said alternator at a speed proportional to the speed of said machine so that the frequency of said alternator is the same as the frequency of the supply circuit when said machine is operating in synchronism, and means controlled by the phase relation of the voltage of said alternator relative to the voltage derived from said supply circuit for producing in said exciter an exciting flux of slip frequency when said machine is operating out of synchronism and a unidirectional flux when said machine is operating in synchronism.

10. An excitation control system for a synchronous machine connected to an electric supply circuit comprising a dynamo-electric exciter of the armature reaction excited type having its output brushes connected to the field winding of the synchronous machine, a single phase transformer having a primary winding and a secondary winding with an intermediate tap, means for applying to said primary winding a voltage having a frequency which varies with the frequency of said supply circuit, a single phase alternator having one terminal connected to said intermediate tap of said secondary winding and its other terminal connected to each of the two end terminals of said secondary winding, two full wave rectifiers respectively connected in series between said end terminals of said secondary winding and said other terminal of said alternator, and two control windings for said exciter respectively connected in series between said end terminals of said secondary winding and said other terminal of said alternator and arranged to produce opposing fluxes in said exciter.

11. An excitation control system for a synchronous machine connected to an electric supply circuit comprising a dynamo-electric exciter of the armature reaction excited type having its output brushes connected to the field winding of the synchronous machine, a single phase transformer having a primary winding and a secondary winding with an intermediate tap, means for applying to said primary winding a voltage having a frequency which varies with the frequency of said supply circuit, a single phase alternator having one terminal connected to said intermediate tap of said secondary winding and its other terminal connected to each of the two end terminals of said secondary winding, two full wave rectifiers respectively connected in series between said end terminals of said secondary winding and said other terminal of said alternator, two control windings for said exciter respectively connected in series between said end terminals of said secondary winding and said other terminal of said alternator and arranged to produce opposing fluxes in said exciter, and means for varying the phase relation between the secondary voltage of said transformer and the voltage of said alternator.

ERNST F. W. ALEXANDERSON.